United States Patent
Arakawa et al.

(10) Patent No.: US 11,186,740 B2
(45) Date of Patent: Nov. 30, 2021

(54) INORGANIC PARTICLE DISPERSION

(71) Applicant: HARIMA CHEMICALS, INC., Hyogo (JP)

(72) Inventors: Takayasu Arakawa, Tsukuba (JP); Yoshiaki Yamabayashi, Tsukuba (JP); Hideyuki Goto, Tsukuba (JP)

(73) Assignee: HARIMA CHEMICALS, INC., Hyogo (JP)

(*) Notice: Subject to any disclaimer, the term of this patent is extended or adjusted under 35 U.S.C. 154(b) by 0 days.

(21) Appl. No.: 16/500,500

(22) PCT Filed: Mar. 30, 2018

(86) PCT No.: PCT/JP2018/013660
§ 371 (c)(1),
(2) Date: Oct. 3, 2019

(87) PCT Pub. No.: WO2018/186295
PCT Pub. Date: Oct. 11, 2018

(65) Prior Publication Data
US 2020/0062989 A1    Feb. 27, 2020

(30) Foreign Application Priority Data
Apr. 7, 2017  (JP) .............................. JP2017-076722

(51) Int. Cl.
*C09D 17/00*    (2006.01)
*C09D 201/06*    (2006.01)
(Continued)

(52) U.S. Cl.
CPC .............. *C09D 17/006* (2013.01); *C08J 3/20* (2013.01); *C08K 3/08* (2013.01); *C08K 3/36* (2013.01);
(Continued)

(58) Field of Classification Search
CPC .............. C08J 3/20; C08K 2003/0806; C08K 2003/0831; C08K 2003/085; C08K 3/08;
(Continued)

(56) References Cited

U.S. PATENT DOCUMENTS 7,137,278 B2* 11/2006 Ott .......................... C03C 1/004
65/134.3
2001/0051689 A1    12/2001 Foreman et al.
(Continued)

FOREIGN PATENT DOCUMENTS

JP    5-114305    5/1993
JP    11-323147    11/1999
(Continued)

OTHER PUBLICATIONS

ESpaceNet machine translation of JP-2009235403-A originally published to Matsunaga on Oct. 15, 2009. (Year: 2009).*
(Continued)

*Primary Examiner* — Karl E Group
*Assistant Examiner* — Cameron K Miller
(74) *Attorney, Agent, or Firm* — Greenblum & Bernstein, P.L.C.

(57) ABSTRACT

An inorganic particle dispersion having high spinnability comprises an inorganic powder, hydrophilic fumed silica, and a resin having a hydroxyl group.

8 Claims, 2 Drawing Sheets

(51) Int. Cl.
  *C08J 3/20*   (2006.01)
  *C08K 3/08*   (2006.01)
  *C08K 3/36*   (2006.01)
  *C08K 3/40*   (2006.01)

(52) U.S. Cl.
  CPC .............. *C08K 3/40* (2013.01); *C09D 17/002* (2013.01); *C09D 201/06* (2013.01); *C08K 2003/085* (2013.01); *C08K 2003/0806* (2013.01); *C08K 2003/0831* (2013.01)

(58) Field of Classification Search
  CPC .......... C08K 3/36; C08K 3/40; C09D 17/002; C09D 201/06; C08D 17/006
  USPC ........................................................ 106/403
  See application file for complete search history.

(56) References Cited

U.S. PATENT DOCUMENTS

| | | | |
|---|---|---|---|
| 2004/0143033 A1* | 7/2004 | Schwarte | C09D 7/61 523/171 |
| 2006/0100344 A1* | 5/2006 | Stenzel | B60C 1/0016 524/493 |
| 2009/0032293 A1 | 2/2009 | Miyakawa et al. | |
| 2010/0316794 A1 | 12/2010 | Miyakawa et al. | |
| 2011/0086174 A1* | 4/2011 | Lee | C04B 41/4853 427/407.1 |
| 2011/0147672 A1 | 6/2011 | Yang et al. | |

FOREIGN PATENT DOCUMENTS

| | | | |
|---|---|---|---|
| JP | 11323147 A | * | 11/1999 |
| JP | 2001062385 | * | 2/2001 |
| JP | 2001-172557 | | 6/2001 |
| JP | 2003-525954 | | 9/2003 |
| JP | 2004123765 | * | 2/2004 |
| JP | 2009-235403 | | 10/2009 |
| JP | 2009235403 A | * | 10/2009 |
| JP | 2010-199303 | | 9/2010 |
| JP | 2011-526960 | | 10/2011 |
| JP | 2013-227514 | | 11/2013 |
| JP | 2014-001476 | | 1/2014 |
| WO | 2006/101127 | | 9/2006 |
| WO | 2013/125252 A1 | | 8/2013 |

OTHER PUBLICATIONS

ESpaceNet machine translation of JP-H11323147-A originally published to Masaki on Nov. 26, 1999. (Year: 1999).*

International Search Report issued in International Patent Application No. PCT/JP2018/013660, dated Jul. 3, 2018.

International Preliminary Report on Patentability issued in International Patent Application No. PCT/JP2018/013660, dated Oct. 8, 2019, and Written Opinion of the International Search Authority for International Patent Application No. PCT/JP2018/013660, dated Jul. 3, 2018.

* cited by examiner

INORGANIC PARTICLE DISPERSION

TECHNICAL FIELD

The present invention relates to a dispersion containing inorganic particles that is excellent in spinnability.

BACKGROUND ART

In recent years, development of a technique for precisely coating a substrate with a coating liquid containing an inorganic particle dispersion in a wide range in a short period of time has been desired particularly in the field of electronic materials. One of precision coating methods is, for example, a coating method using a flat nozzle type discharge means (dispenser). In this coating method, a coating liquid having thixotropic property is discharged in such a manner that a gap (clearance) between the nozzle and the substrate is filled with the coating liquid (see Patent Literature 1).

CITATION LIST

Patent Literature

[Patent Literature 1] Japanese Patent Laid-Open No. 2014-1476

SUMMARY OF INVENTION

Technical Problem

However, when coating is carried out by the aforesaid coating method, the coating liquid is required to have high elasticity and spinnability so that the coating liquid may not break up during coating. Moreover, in order to minimize shear stress applied to the coating liquid, there are restrictions on the coating process such that the coating weight is increased to carry out thick film coating (the coating film thickness is made equal to the clearance) and the coating speed is decreased.

The present invention has been proposed in the light of the above points, and in one aspect, the object of the present invention is to provide an inorganic particle dispersion having high spinnability.

Solution to Problem

The inorganic particle dispersion according to one embodiment of the present invention comprises an inorganic powder, hydrophilic fumed silica, and a resin having a hydroxyl group.

Advantageous Effect of Invention

According to an embodiment of the present invention, in one aspect, an inorganic particle dispersion having high spinnability can be provided.

DESCRIPTION OF EMBODIMENT

Figure 1:
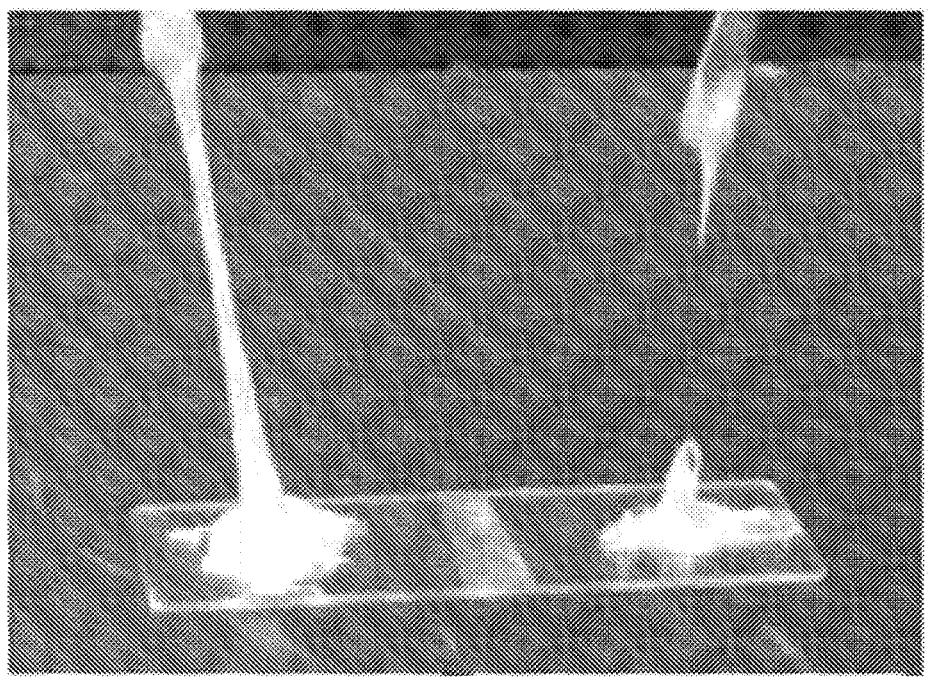
FIG. 1 is a view to describe spinnability of the inorganic particle dispersion according to the present embodiment.

The inorganic particle dispersion in one embodiment of the present invention is described hereinafter referring to the drawings. In the present embodiment, the inorganic particle dispersion contains an inorganic component as a main component, and may contain organic components as other components. Examples of the other components include various additives for enhancing spinnability, a dispersant for enhancing dispersibility of inorganic particles, a leveling agent for enhancing leveling property, and an organic solvent for adjusting a viscosity of a coating liquid.

The inorganic particle dispersion according to the present embodiment is generally applied onto a substrate and dried. On the resulting dry film, desired printing (including drawing) is carried out, and thereafter, the film is calcined, whereby an inorganic (residual carbon-free) dense film can be obtained. The organic components are decomposed and disappear by the calcining.

(Inorganic Particle Dispersion)

The inorganic particle dispersion according to the present embodiment contains at least an inorganic powder, hydrophilic fumed silica and a resin having a hydroxyl group. The inorganic particle dispersion according to the present embodiment may contain other organic components for enhancing characteristics.

The constituents contained in the inorganic particle dispersion according to the present embodiment are described below in detail.

(Inorganic Powder)

Examples of the inorganic powders contained in the inorganic particle dispersion according to the present embodiment include, but not limited to, a glass powder, and metal powders, such as a gold powder, a silver powder, a copper powder, an iron powder, a stainless steel powder, a titanium powder, a nickel powder, a chromium powder, a tungsten powder and a molybdenum powder.

The powders enumerated above are sintered by calcining them at high temperatures (the temperature depends on the material used, but when a glass powder is used, it is a temperature equal to or higher than the softening point of glass). By utilizing this, a dense inorganic film can be formed on the substrate.

When a glass powder is used as the inorganic powder, it is preferable to add a component adjusting agent for inhibiting foaming of glass and inhibiting character collapsing after printing. The component adjusting agent melts into a glass film that is formed during calcining of glass, and plays a role of controlling fluidity or clarification action when the glass is softened.

Examples of preferred component adjusting agents include kaolin containing an alumina component as a main component, calcined kaolin, and bentonite containing an alkali metal as a main component. By adding a component adjusting agent of a prescribed type in a prescribed amount, the aforesaid foaming and character collapsing can be inhibited without lowering Vickers strength of the resulting inorganic film, though it depends also on the amount of the glass powder used.

The content of the inorganic powder in the inorganic particle dispersion according to the present embodiment is usually 10% by mass to 85% by mass, and preferably 40% by mass to 70% by mass. When the content of the inorganic powder is less than 10% by mass, a sufficient filler cannot exist in the inorganic film obtained after sintering, and therefore, performance of the sintered product sometimes cannot be ensured. When the content of the inorganic powder exceeds 85% by mass, the viscosity sometimes cannot be adjusted to a viscosity suitable for application.

(Hydrophilic Fumed Silica)

The hydrophilic fumed silica is a kind of dry silica obtained through steps of oxidation in flames, desalination, purification and the like, using silicon tetrachloride as a starting material.

The hydrophilic fumed silica interacts with a resin having a hydroxyl group described later, whereby spinnability of the resulting inorganic particle dispersion is enhanced. On that account, even when relatively high shear stress is applied to the inorganic particle dispersion when the dispersion is applied as a coating liquid, the coating liquid does not easily break up. Accordingly, even when the inorganic particle dispersion according to the present embodiment is applied to a coating method in which shear stress is applied, the dispersion can be applied onto a substrate at a high speed with precision.

Examples of the fumed silica include hydrophilic fumed silica and hydrophobic fumed silica obtained by surface-treating this hydrophilic fumed silica with a silane-based additive (silane coupling agent), and from the viewpoint of spinnability of the resulting inorganic particle dispersion, hydrophilic fumed silica is preferably used.

The content of the fumed silica in the inorganic particle dispersion according to the present embodiment is usually 0.01% by mass to 5% by mass, and preferably 0.05% by mass to 2% by mass. If the content of the fumed silica is less than 0.01% by mass, spinnability of the resulting inorganic particle dispersion is not displayed sometimes. When the content of the fumed silica exceeds 5% by mass, silica remaining in a sintered film after sintering sometimes changes characteristics of the sintered film.

(Resin Having Hydroxyl Group)

The resin having a hydroxyl group is not particularly limited, but in order to enhance spinnability of the resulting inorganic particle dispersion, it is preferable to use a resin having high elasticity. Specifically, a modified acrylic resin, an epoxy resin, a urethane resin, a phenolic resin, ethyl cellulose, a butyral resin (in butyral resin, hydroxyl group remains from the viewpoint of production process), a gelatin resin, etc. having a hydroxyl group can be preferably used. Resins modified so as to have a hydroxyl group may be used as these resins.

As previously described, the resin having a hydroxyl group interacts with the fumed silica, whereby spinnability of the resulting inorganic particle dispersion is enhanced. On that account, even when relatively high shear stress is applied to the inorganic particle dispersion when the dispersion is applied, a coating liquid containing the inorganic particle dispersion does not easily break up. Accordingly, even when the inorganic particle dispersion according to the present embodiment is applied to a coating method in which shear stress is applied, the dispersion can be applied onto a substrate at a high speed with precision.

The content of the resin having a hydroxyl group in the inorganic particle dispersion according to the present embodiment is usually 1% by mass to 50% by mass, and preferably 5% by mass to 35% by mass. When the content of the resin having a hydroxyl group is less than 1% by mass, spinnability of the resulting inorganic particle dispersion is not displayed sometimes. When the content of the resin having a hydroxyl group exceeds 50% by mass, the viscosity sometimes cannot be adjusted to a viscosity suitable for application.

(Other Components)

The inorganic particle dispersion according to the present embodiment may contain other components for enhancing characteristics of a coating liquid. Examples of other components include a dispersant for enhancing dispersibility of inorganic particles, a leveling agent for enhancing leveling property, an organic solvent for adjusting a viscosity of a coating liquid, and various additives for enhancing spinnability.

<<Dispersant>>

The inorganic particle dispersion according to the present embodiment may contain a dispersant having a functional group or the like at the end in order to stably disperse particles in the dispersion. The content of the dispersant is preferably 0.1 to 5% by mass. Since the dispersant is contained, functional groups of the dispersant are coordinated on the surfaces of the particles to thereby inhibit the particles from approaching each other, whereby reaggregation of the particles is suppressed, and the dispersibility of the particles can be enhanced.

The dispersant is not particularly limited, and for example, a cationic dispersant, an anionic dispersant, a nonionic dispersant, an amphoteric dispersant, a silicone-based dispersant, a fluorine-based dispersant or the like can be used.

In order to prevent settling of a filler, the inorganic particle dispersion according to the present embodiment may contain a wetting dispersant (anti-settling agent). The content of the wetting dispersant is preferably 0.1 to 5% by mass. By adding the wetting dispersant, hardening (hard-caking) of settlings can be prevented while retarding settling of a filler in the inorganic particle dispersion. As a result, storage stability of the resulting inorganic particle dispersion can be enhanced by adding the wetting dispersant.

Specific examples of the wetting dispersants (anti-settling agents) include "TIXOGEL series" (e.g., trade name "TIXOGEL-EZ 100") which are bentonite-based additives manufactured by BYK Japan KK. Other examples thereof include "CLAYTONE series", "GARAMITE series", "CLOISITE series" and "OPTIGEL series", all of which are bentonite-based additives manufactured by BYK Japan KK.

<<Leveling Agent>>

In order to prevent foaming or improve leveling property, the inorganic particle dispersion according to the preset embodiment may contain a leveling agent. The content of the leveling agent is preferably 0.1 to 5% by mass. The leveling agent plays not only a role of enhancing wettability by decreasing a contact angle or surface tension of the inorganic particle dispersion against defects occurring on the coating film surface, such as coating streaks, craters and pinholes, but also a role of extending the inorganic particle dispersion by the orientation of the leveling agent on the coating film surface.

The leveling agent is not particularly limited, and a publicly known one can be used. Specific examples of the leveling agents include "BYK (trade name)-361N", "BYK (trade name)-360P", "BYK (trade name)-364P", "BYK (trade name)-368P", "BYK (trade name)-3900P", "BYK (trade name)-3931P", "BYK (trade name)-3933P", "BYK (trade name)-3950P", "BYK (trade name)-3951P" and "BYK (trade name)-3955P" which are trade names of BYK Japan KK.

<<Resin Having High Elastic Modulus>>

In order to enhance spinnability, the inorganic particle dispersion according to the present embodiment may contain other resin components. The content of other resin components is preferably 1 to 10% by mass. Other resin components are preferably resins having high elastic modulus, and examples of such resins include the above-described resin having a hydroxyl group, an acrylic resin having no hydroxyl group, a polybutadiene rubber, a polyisoprene rubber, a butyl rubber and a urethane rubber. Hydrogenated resins may be used as these resins.

By compounding the above resin, spinnability of the inorganic particle dispersion can be enhanced, and specifically, the spinnability can be increased by about 0.2 Pa in terms of a normal force value though it depends on the types and the contents of other components.

<<Organic Solvent>>

The inorganic particle dispersion according to the present embodiment may contain an organic solvent for adjusting a viscosity of a coating liquid. The content of the organic solvent is preferably 10 to 50% by mass. Examples of preferred organic solvents include hydrocarbon-based solvents, such as toluene, xylene, cyclohexane, octane, butane, dodecane and tetradecane. Alternatively, a ketone-based organic solvent may be used though it depends on the type of the resin used. Examples of the ketone-based organic solvents include acetone, methyl ethyl ketone, methyl isobutyl ketone, diisobutyl ketone, isophorone and cyclohexanone.

<<Additive>>

The inorganic particle dispersion according to the present embodiment may contain other additives according to the characteristics desired. The content of other additives is preferably 0.1 to 5% by mass.

Examples of other additives include additives having high solvent absorption property that are added for the purpose of enabling high-quality printing on the resulting inorganic film. By virtue of the additives having high solvent absorption property, an ink is sucked into pores and kept therein, so that high printability is displayed.

Specific examples of the additives having high solvent absorption property include porous fine particles, such as porous silica and porous alumina (fumed alumina), a resin component that swells and absorbs a solvent, and hydrated alumina.

(Process for Producing Inorganic Particle Dispersion)

Using the materials described above, the process for producing the inorganic particle dispersion according to the present embodiment is described.

The above-described fumed silica and resin having a hydroxyl group are mixed in prescribed amounts, and they are stirred using a high-speed dispersing machine such as a disperser until they become homogeneous. When the dispersant, the leveling agent, the additive having high solvent absorption property, and the component adjusting agent for glass are added as other components, they are added at the same timing as the timing of the addition of the above materials.

To the resulting stirred liquid, the inorganic powder described above is added, and they are stirred using a high-speed dispersing machine such as a disperser until the inorganic powder is homogeneously dispersed. When the resin having a high elastic modulus is added, the resin is added at the same timing as the timing of the addition of the inorganic powder.

Finally, the resulting coating liquid is filtered through a 400-mesh stainless steel net or the like, and by the use of the solvent described above, the viscosity of the coating liquid is adjusted to a prescribed one.

(Applicable Coating Method for Inorganic Particle Dispersion)

The inorganic particle dispersion according to the present embodiment has high spinnability. On that account, even when high shear stress is applied, the inorganic particle dispersion does not easily break up, and even when the inorganic particle dispersion is applied to various coating methods in which shear stress is applied, high-speed and high-precision coating can be realized.

Specifically, the inorganic particle dispersion according to the present embodiment can be applied onto a substrate at a high speed with high precision even when the dispersion is applied to a method in which the coating liquid is applied using a flat nozzle type dispenser in such a manner that the coating liquid is stretched, a method in which the discharge liquid is applied while the liquid is spirally wound on the substrate by a needle nozzle or a multi nozzle, a coating method using a slit coater, or the like.

EXAMPLES

Example 1

In a high-speed dispersing machine, 157 g of a modified acrylic resin (DHM-63-20HC, manufactured by Harima Chemicals Group, Inc.) as a resin having a hydroxyl group, 0.5 g of hydrophilic fumed silica (AEROSIL 380, average particle diameter: 50 nm, manufactured by Nippon Aerosil Co., Ltd.), 7 g of fumed alumina (SpectrAl 100, product code: FA-100) as an ink absorbing component, 5 g of Noigen (ET-89) as a dispersant, 19.5 g of calcined kaolin (PoleStar 400) as a component adjusting agent for glass, 10 g of an anti-settling agent for fillers (TIXOGEL-EZ100), and 5 g of a leveling agent (BYK-392) were placed. Using the high-speed dispersing machine, stirring was carried out at 1500 rpm for 30 minutes to disperse each component.

In the resulting dispersion, 300 g of a glass powder and 5 g of hydrogenated polybutadiene (GI-3000) were placed, and stirring was further carried out at 1500 rpm for 15 minutes.

To the resulting kneadate, tetradecane was added as a diluent solvent, and the adjustment was made in such a manner that the viscosity became a prescribed viscosity (10 to 11 Pa·s).

A normal force value of the resulting inorganic particle dispersion was measured, and as a result, the maximum normal force value was 2.6 Pa. In the measurement of the normal force value, the behavior of normal force (normal stress) given when a flat cone plate 25 mm in diameter ϕ was pulled up at a rate of 10 mm/s was first measured using a rheometer MCR301 (manufactured by Anton Paar Japan K.K.). In the behavior of the normal force, the maximum value was reached immediately before the coating liquid was stretched and began to break up, and the spinnability was evaluated by the use of this maximum value.

Since the inorganic particle dispersion obtained in the present example is in a state where the hydroxyl group of the modified acrylic resin and the hydrophilic fumed silica interact with each other, the dispersion has high spinnability. That is to say, even when shear stress is applied to the inorganic particle dispersion obtained in the present example, the dispersion does not easily break up. Actually, the inorganic particle dispersion obtained in the present example was applied onto a substrate using a flat nozzle type dispenser in such a manner that the coating liquid was stretched, and as a result, high-speed and high-precision coating was able to be realized. The method for evaluating the high-speed and high-precision coating will be described later.

In the inorganic particle dispersion according to the present embodiment, a leveling agent can be compounded, and therefore, the coating film can be smoothened after coating. In the inorganic particle dispersion according to the present embodiment, moreover, an ink absorbing component can be compounded, and therefore, even when inkjet printing is carried out on the coating film, characters or patterns are not blurred. In the inorganic particle dispersion according to the present embodiment, furthermore, a component adjusting agent for glass can be compounded, and therefore, even when printed characters or patterns are calcined, the characters or the patterns do not easily collapse.

Example 2

In a high-speed dispersing machine, 157 g of a modified acrylic resin (DHM-63-20HC, manufactured by Harima Chemicals Group, Inc.) as a resin having a hydroxyl group, 0.5 g of hydrophilic fumed silica (AEROSIL 380, average particle diameter: 50 nm, manufactured by Nippon Aerosil Co., Ltd.), and 5 g of Noigen (ET-89) as a dispersant were placed. Using the high-speed dispersing machine, stirring was carried out at 1500 rpm for 30 minutes to disperse each component.

In the resulting dispersion, 300 g of a glass powder was placed, and stirring was further carried out at 1500 rpm for 15 minutes.

To the resulting kneadate, tetradecane was added as a diluent solvent, and the adjustment was made in such a manner that the viscosity became a prescribed viscosity (10 to 11 Pa·s).

A normal force value of the resulting inorganic particle dispersion was measured, and as a result, the maximum normal force value was 2.6 Pa. In the present example, it was able to be confirmed that the inorganic particle dispersion had high spinnability even though other components such as a leveling agent were not compounded. Actually, the inorganic particle dispersion obtained in the present example was applied onto a substrate using a flat nozzle type dispenser in such a manner that the coating liquid was stretched, and as a result, high-speed and high-precision coating was able to be realized.

Example 3

An inorganic particle dispersion was obtained in the same manner as in Example 1, except that the hydrophilic fumed silica (AEROSIL 380, average particle diameter: 50 nm, manufactured by Nippon Aerosil Co., Ltd.) used in Example 1 was changed to hydrophilic fumed silica (AEROSIL 50, average particle diameter: 30 nm, manufactured by Nippon Aerosil Co., Ltd.).

A normal force value of the resulting inorganic particle dispersion was measured, and as a result, the maximum normal force value was 2.5 Pa, and this was comparable to that of the inorganic particle dispersion obtained in Example 1.

From the present example, it can be seen that an inorganic particle dispersion having high spinnability can be obtained irrespective of the particle diameter of the hydrophilic fumed silica used.

Example 4

An inorganic particle dispersion of Example 4 was obtained in the same manner as in Example 1, except that the hydrogenated polybutadiene (GI-3000) used in Example 1 was not compounded.

A normal force value of the resulting inorganic particle dispersion was measured, and as a result, the maximum normal force value was 2.2 Pa, and this was a little smaller than that of the inorganic particle dispersion obtained in Example 1 but was a sufficient value.

Comparative Example 1

An inorganic particle dispersion of Comparative Example 1 was obtained in the same manner as in Example 1, except that the hydrophilic fumed silica (AEROSIL 380, average particle diameter: 50 nm, manufactured by Nippon Aerosil Co., Ltd.) in Example 1 was not compounded.

A normal force value of the resulting inorganic particle dispersion was measured, and as a result, the normal force value was 1.6 Pa, and it was found that the spinnability was low as compared with that of the inorganic particle dispersions obtained in Examples 1 to 4.

Further, the inorganic particle dispersion obtained in Comparative Example 1 was applied onto a substrate using a flat nozzle type dispenser in such a manner that the coating liquid was stretched, but thin film coating at a high speed was not able to be carried out.

Comparative Example 2

As another comparative example, an inorganic particle dispersion of Comparative Example 2 was obtained in the same manner as in Example 1, except that the hydrophilic fumed silica (AEROSIL 380, average particle diameter: 50 nm, manufactured by Nippon Aerosil Co., Ltd.) in Example 1 was changed to hydrophobic fumed silica (R805, average particle diameter: 60 nm, manufactured by Nippon Aerosil Co., Ltd.).

A normal force value of the resulting inorganic particle dispersion was measured, and as a result, the normal force value was 1.8 Pa, and it was found that the spinnability was low as compared with that of the inorganic particle dispersions obtained in Examples 1 to 4.

Further, the inorganic particle dispersion obtained in Comparative Example 2 was applied onto a substrate using a flat nozzle type dispenser in such a manner that the coating liquid was stretched, but thin film coating at a high speed was not able to be carried out.

Comparative Example 3

As another comparative example, an inorganic particle dispersion of Comparative Example 3 was obtained in the same manner as in Example 1, except that the modified acrylic resin (DHM-63-20HC, manufactured by Harima Chemicals Group, Inc.) in Example 1 was changed to polyisoprene LIR-50 (manufactured by Kuraray Co., Ltd.), polybutadiene LBR-305 (manufactured by Kuraray Co., Ltd.) or polymethyl methacrylate Epostar MA1002 (manufactured by Nippon Shokubai Co., Ltd.), as a resin containing no hydroxyl group.

A normal force value of the resulting inorganic particle dispersion was measured, and as a result, the normal force value was not more than 1.0 Pa, and it was found that the spinnability was markedly low as compared with that of the inorganic particle dispersions obtained in Examples 1 to 4.

Further, the inorganic particle dispersion obtained in Comparative Example 3 was applied onto a substrate using a flat nozzle type dispenser in such a manner that the coating liquid was stretched, but thin film coating at a high speed was not able to be carried out.

(Evaluation on Spinnability)

In order to clarify a difference in spinnability between the inorganic particle dispersion of Example 1 and the inorganic particle dispersion of Comparative Example 1, spinnability displayed when each of the inorganic particle dispersions was pulled up with the same force is described referring to FIG. 1.

FIG. 1 is a view to describe spinnability of the inorganic particle dispersion according to the present embodiment. In FIG. 1, the inorganic particle dispersion on the left is the inorganic particle dispersion according to Example 1, and the inorganic particle dispersion on the right is the inorganic particle dispersion according to Comparative Example 1.

As is apparent from FIG. 1, the inorganic particle dispersion according to Example 1 is superior to the inorganic particle dispersion according to Comparative Example 1 in spinnability.

(Evaluation on high-speed coating: application to even substrate)

To an outside surface of a cylindrical substrate having an outer diameter $\phi$ of 1 mm and a length of 30 mm, 0.14 g of the inorganic particle dispersion obtained in each of Examples and Comparative Examples was applied in 0.4 second using a flat nozzle having a slit width of 0.6 mm and a width of 25 mm. More specifically, while keeping the flat nozzle 0.6 to 1.2 mm above the substrate side surface (clearance: 0.6 to 1.2 mm) and rotating the substrate at a rotational speed of 150 rpm (coating rate: 79 mm/s) in the circumferential direction, the inorganic particle dispersion was discharged from the flat nozzle at a discharge rate of 15.6 mm/s for 0.4 seconds and thereby applied onto the substrate.

The inorganic particle dispersion obtained in each of Examples was able to be uniformly applied onto the entire circumference of the substrate to form a thin film having a coating film thickness of 240 μm without any non-coated portion.

On the other hand, the inorganic particle dispersion obtained in each of Comparative Examples broke up during coating and was applied in spots. It has been confirmed that the inorganic particle dispersion obtained in each of Comparative Examples was able to be uniformly applied by increasing the discharge rate up to 40 mm/s. In this case, however, the coating weight was 0.36 g and the coating film thickness was 0.6 mm, and the amount of the coating liquid applied became markedly large, so that thin film coating of the substrate was impossible.

(Evaluation on high-speed coating: application to uneven substrate)

To an outside surface of a cylindrical substrate having an outer diameter $\phi$ of 1 mm and a length of 30 mm and having on its outer periphery a plurality of groove-like irregularities going in the circumferential direction, 0.14 g of the inorganic particle dispersion obtained in each of Examples was applied in 0.4 seconds using a flat nozzle having a slit width of 0.6 mm and a width of 25 mm. As the flat nozzle, a flat nozzle whose nozzle opening and slit width had been processed so as to fit the shape of the outer peripheral surface of the substrate was used. More specifically, while keeping the flat nozzle 0.6 mm above the substrate side surface (clearance: 0.6 mm) and rotating the substrate at a rotational speed of 150 rpm (coating rate: 79 mm/s) in the circumferential direction, the inorganic particle dispersion was discharged from the flat nozzle at a discharge rate of 15.6 mm/s for 0.4 seconds and thereby applied onto the substrate.

The inorganic particle dispersion obtained in each of Examples was able to be uniformly applied onto the entire circumference of the substrate to form a thin film having a coating film thickness of 240 μm without any non-coated portion.

(Other Evaluation: Finish Quality of Coating Film)

Figure 2:
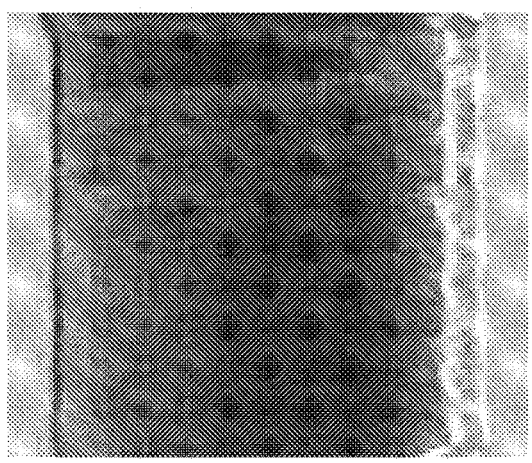
FIG. 2 shows an example of a coating film formed by using the inorganic particle dispersion according to the present embodiment.
Figure 3:
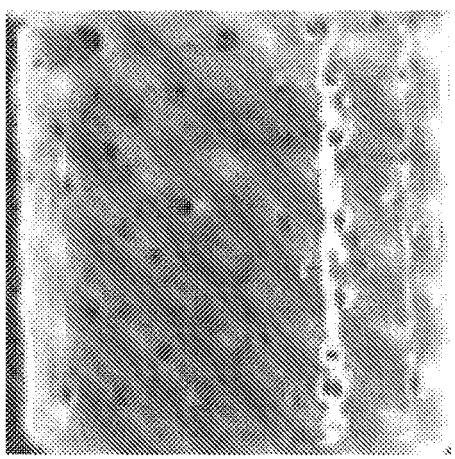
FIG. 3 shows an example of a coating film formed by using the inorganic particle dispersion according to the present embodiment.

In FIG. 2 and FIG. 3, examples of coating films formed by using the inorganic particle dispersions according to the present embodiment are shown. FIG. 2 shows a coating film using the inorganic particle dispersion according to Example 1, and FIG. 3 shows a coating film using the inorganic particle dispersion according to Example 2.

The coating film shown in FIG. 2 proves to have a uniform surface as compared with the coating film shown in FIG. 3. In the coating film shown in FIG. 3, coating film defects such as pinholes are observed on the surface. Since the inorganic particle dispersion according to Example 1 contained a leveling agent, it had high leveling property. It is thought that for the above reason, leveling by the inorganic particle dispersion was able to compensate for the coating film defects such as coating marks and pinholes occurring during coating, and as a result, a uniform coating film was obtained.

From the above result, it can be seen that the inorganic particle dispersion according to the present embodiment preferably contains a leveling agent.

(Other Evaluation: Printability of Coating Film)

Figure 4:
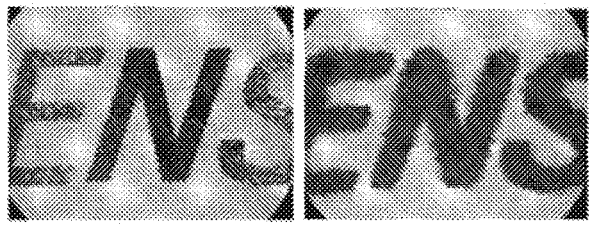
FIG. 4 is a group of views to describe printability of a coating film formed by using the inorganic particle dispersion according to the present embodiment.

FIG. 4 is a group of views to describe printability of a coating film formed by using the inorganic particle dispersion according to the present embodiment. The left view in FIG. 4 is a view of a film in which prescribed characters (characters of E, N and S) have been printed (overglaze painted) on a dry film of a coating film obtained by using the inorganic particle dispersion according to Example 1, and the right view in FIG. 4 is a view of a film in which prescribed characters have been printed on a dry film of a coating film obtained by using the inorganic particle dispersion according to Example 2.

The characters shown in the left view of FIG. 4 have clear character outlines as compared with the characters shown in the right view of FIG. 4. In other words, the characters shown in the right view of FIG. 4 are blurred. Since the inorganic particle dispersion according to Example 1 contained fumed alumina, the dry product of the resulting coating film had high ink absorption property. It is thought that for the above reason, characters or patterns were able to be printed with high quality on the dry film of the coating film obtained by applying the inorganic particle dispersion.

From the above result, it can be seen that the inorganic particle dispersion according to the present embodiment preferably contains an additive having high solvent absorption property.

(Other Evaluation: Component Adjusting Agent for Glass)

Figure 5:
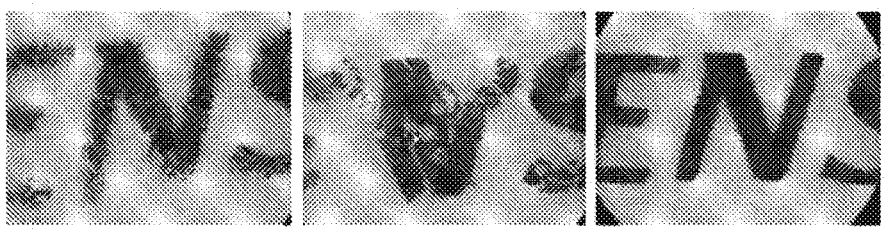
FIG. 5 is a group of views to describe an effect of a component adjusting agent for glass in the inorganic particle dispersion according to the present embodiment.

FIG. 5 is a group of views to describe an effect of a component adjusting agent for glass in the inorganic particle dispersion according to the present embodiment. The left view and the central view in FIG. 5 are each a view of a film in which prescribed characters (characters of E, N and S) have been printed (overglaze painted) on a dry film of a coating film obtained by using the inorganic particle dispersion according to Example 2 and then calcined, and the right view in FIG. 5 is a view of a film in which prescribed characters have been printed on a dry film of a coating film obtained by using the inorganic particle dispersion according to Example 1 and then calcined.

The characters shown in the left view and the central view of FIG. 5 suffer occurrence of character collapsing, but as compared with this, the characters shown in the right view of FIG. 5 do not suffer occurrence of character collapsing. The reason for this is that the inorganic particle dispersion according to Example 1 contained kaolin, and therefore, even though calcining was carried out at a temperature not lower than the softening point of glass, fluidity of softened glass was able to be suppressed.

From the above result, it can be seen that when a glass powder is used as the inorganic particles, it is preferable to add a component adjusting agent such as kaolin to the inorganic particle dispersion according to the present embodiment.

The above descriptions are only examples, and the present invention is in no way limited to the structure of the above embodiment.

The invention claimed is:

1. An inorganic particle dispersion comprising
an inorganic powder,
hydrophilic fumed silica,
an organic solvent for adjusting a viscosity of the inorganic particle dispersion, and
a resin having a hydroxyl group;
wherein a content of a resin having a hydroxyl group is 1-50 mass percent of the organic particle dispersion,
wherein a content of the organic solvent is 10-50 mass percent,
wherein a content of inorganic powder is 10-85 mass percent of the inorganic particle dispersion, and
wherein the content of hydrophilic fumed silica is 0.01 to 5 mass percent of the organic particle dispersion.

2. The inorganic particle dispersion according to claim 1, wherein the resin having a hydroxyl group comprises a modified acrylic resin, an epoxy resin, a urethane resin, a phenolic resin, ethyl cellulose, a butyral resin or a gelatin resin having a hydroxyl group.

3. The inorganic particle dispersion according to claim 1, wherein the inorganic powder comprises a glass powder, a gold powder, a silver powder, a copper powder, an iron powder, a stainless steel powder, a titanium powder, a nickel powder, a chromium powder, a tungsten powder or a molybdenum powder.

4. The inorganic particle dispersion according to claim 1, further comprising a dispersant or a leveling agent.

5. The inorganic particle dispersion according to claim 1, further comprising an acrylic resin, a polybutadiene rubber, a polyisoprene rubber, a butyl rubber or a urethane rubber.

6. The inorganic particle dispersion according to claim 1, wherein
the inorganic powder is a glass powder, and
the inorganic particle dispersion further comprises a component adjusting agent for the glass powder.

7. A process for producing an inorganic particle dispersion, comprising
mixing at least fumed silica and a resin having a hydroxyl group in prescribed amounts and stirring them to form a kneadate,
adding a prescribed amount of an inorganic powder to the kneadate and stirring the inorganic powder and the kneadate, and
filtering the kneadate;
wherein a content of inorganic powder is 10-85 mass percent of the inorganic particle dispersion,
wherein a content of a resin having a hydroxyl group is 1-50 mass percent of the inorganic particle dispersion,
wherein a content of an organic solvent in the inorganic particle dispersion is 10-50 mass percent of the inorganic particle dispersion, and
wherein the content of fumed silica is 0.01 to 5 mass percent of the organic particle dispersion.

8. The inorganic particle dispersion according to claim 1, further comprising a leveling agent.

* * * * *